(12) United States Patent
Kapinos et al.

(10) Patent No.: US 11,369,874 B2
(45) Date of Patent: Jun. 28, 2022

(54) RENDERING VIDEO GAME ON DISPLAY DEVICE USING GPU IN DISPLAY DEVICE AND VIDEO GAME DATA FROM SECOND DEVICE

(71) Applicant: Lenovo (Singapore) Pte. Ltd., Singapore (SG)

(72) Inventors: Robert J. Kapinos, Durham, NC (US); Robert Norton, Raleigh, NC (US); Russell Speight VanBlon, Raleigh, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 146 days.

(21) Appl. No.: 16/862,228

(22) Filed: Apr. 29, 2020

(65) Prior Publication Data

US 2021/0339139 A1 Nov. 4, 2021

(51) Int. Cl.
*A63F 13/537* (2014.01)
*A63F 13/35* (2014.01)
*G06T 15/00* (2011.01)

(52) U.S. Cl.
CPC ............ *A63F 13/537* (2014.09); *A63F 13/35* (2014.09); *G06T 15/005* (2013.01); *G06T 2200/16* (2013.01)

(58) Field of Classification Search
CPC . G06T 15/005; G06T 2200/16; A63F 13/537; A63F 13/35
See application file for complete search history.

(56) References Cited

U.S. PATENT DOCUMENTS

| 2005/0128220 A1* | 6/2005 | Marrin | G06T 13/00 345/619 |
| 2005/0280655 A1* | 12/2005 | Hutchins | G06T 15/005 345/581 |
| 2008/0055318 A1* | 3/2008 | Glen | G09G 3/20 345/501 |

(Continued)

OTHER PUBLICATIONS

"Sample- and Frame-Based Concepts", HelpCenter, MathWorks, retrieved Apr. 23, 2020 from https://www.mathworks.com/help/dsp/ug/sample-and-frame-based-concepts.html.

(Continued)

*Primary Examiner* — Steve Rowland
(74) *Attorney, Agent, or Firm* — John M. Rogitz; John L. Rogitz (57) ABSTRACT

In one aspect, a first device includes a processor, a display, a GPU, and storage. The storage includes instructions executable to communicate with a second device to receive frame-based data in a compressed data stream and to receive, via a sideband, video game frame rendering requests. The instructions are also executable to communicate with the second device to receive texture data pertaining to objects to render on the display as part of a video game associated with the video game frame rendering requests, and/or to receive 3D model data pertaining to objects to render on the display as part of the video game. The instructions are also executable to render, using the GPU, video game frames based on the video game frame rendering requests and based on the texture data and/or the 3D model data. The first device may be a TV and the second device may be a personal computer.

20 Claims, 3 Drawing Sheets

(56) References Cited

U.S. PATENT DOCUMENTS

| | | | | |
|---|---|---|---|---|
| 2010/0164983 | A1* | 7/2010 | Lawrence | G06T 15/00 345/611 |
| 2011/0129198 | A1* | 6/2011 | Toma | H04N 9/8042 386/239 |
| 2011/0164860 | A1* | 7/2011 | Nakagawa | H04N 5/783 386/343 |
| 2012/0092366 | A1* | 4/2012 | Smithers | G06T 15/04 345/629 |
| 2012/0147027 | A1* | 6/2012 | Molnar | G06T 15/005 345/582 |
| 2013/0106810 | A1* | 5/2013 | Kim | G06F 1/3265 345/204 |
| 2013/0203501 | A1* | 8/2013 | Pereira | A63F 13/86 463/42 |
| 2013/0257752 | A1* | 10/2013 | Tripathi | G09G 3/20 345/173 |
| 2014/0289423 | A1* | 9/2014 | Kim | H04N 21/44227 709/233 |
| 2015/0348493 | A1* | 12/2015 | Chae | G09G 5/00 345/212 |
| 2016/0253809 | A1* | 9/2016 | Cole | H04N 13/139 345/672 |
| 2017/0212771 | A1* | 7/2017 | Weissberg | G06F 3/04845 |
| 2019/0262711 | A1* | 8/2019 | Perlman | H04N 21/6587 |

OTHER PUBLICATIONS

"Sample-Based and Frame-Based Processing", HelpCenter, MathWorks, retrieved on Apr. 23, 2020, from https://www.mathworks.com/help/comm/ug/sample-based-and-frame-based-processing.html.

* cited by examiner

RENDERING VIDEO GAME ON DISPLAY DEVICE USING GPU IN DISPLAY DEVICE AND VIDEO GAME DATA FROM SECOND DEVICE

FIELD

The present application relates to technically inventive, non-routine solutions that are necessarily rooted in computer technology and that produce concrete technical improvements.

BACKGROUND

As recognized herein, low-end personal computers (PC) such as smart phones, tablets, and inexpensive laptops are everywhere and are often used for video gaming. As also recognized herein, video gamers that use such devices might still want to play their video games using a relatively large display device such as a flat-screen television (TV). However, current technology does not adequately allow for the effective processing and transfer of game graphics to TVs to do so. As such, there are currently no adequate solutions to the foregoing computer-related, technological problem.

SUMMARY

Accordingly, in one aspect a first device includes at least one processor, a display accessible to the at least one processor, a graphics processing unit (GPU), and storage accessible to the at least one processor. The storage includes instructions executable by the at least one processor to communicate with a second device to receive frame-based data in a compressed data stream, where the second device is different from the first device. The instructions are also executable to communicate with the second device to receive, via a first sideband, video game frame rendering requests. Still further, the instructions are executable to communicate with the second device to receive texture data pertaining to one or more objects to render on the display as part of a video game associated with the video game frame rendering requests, and/or to receive three-dimensional (3D) model data pertaining to one or more objects to render on the display as part of the video game. Additionally, the instructions are executable to render on the display, using the GPU, video game frames based on the video game frame rendering requests and based on one or more of the texture data and the 3D model data.

The GPU may be different from the at least one processor, and the first device may be established by a television.

In some implementations, the instructions may be executable to receive one or more of the texture data and 3D model data over a second sideband, where the second sideband may be different from the first sideband. In some examples, the first and second sidebands may be opened responsive to the video game being initialized.

Also in some implementations, the texture data and/or the 3D model data may be received using a standardized application programming interface (API). Still further, in some examples the communication with the second device may occur over a high-definition multimedia interface (HDMI) connection and/or a DisplayPort (DP) connection. Additionally, in some implementations the frame-based data received in the compressed data stream may be related to an electronic desktop of the second device.

Also in certain examples, the texture data and/or 3D model data may be received at the first device prior to the rendering of the video game frames. In other examples, at least some of the texture data and/or 3D model data may be received at the first device while the first device renders at least some of the video game frames.

In another aspect, a method includes communicating, at a first device, with a second device to receive video game frame rendering requests. The method also includes communicating with the second device to receive texture data pertaining to one or more objects to render on a display of the first device as part of a video game associated with the video game frame rendering requests, and/or to receive three-dimensional (3D) model data pertaining to one or more objects to render on the display as part of the video game. The method also includes rendering on the display, using a GPU on the first device, video game frames based on the video game frame rendering requests and based on one or more of the texture data and 3D model data.

In some examples, the first device may be established by a television and the second device may be established by a smart phone.

Also in some examples, the method may include communicating with the second device to receive frame-based data received at the first device in a compressed data stream. The method may also include communicating with the second device to receive the video game frame rendering requests via a first sideband and communicating with the second device via a second sideband different from the first sideband to receive the texture data and/or receive the 3D model data.

In still another aspect, at least one computer readable storage medium (CRSM) that is not a transitory signal includes instructions executable by at least one processor to execute a video game at a first device and to communicate with a second device to transmit, via a first sideband, video game frame rendering requests. The instructions are also executable to communicate with the second device to transmit texture data pertaining to one or more objects to render on the display as part of a video game associated with the video game frame rendering requests and/or to transmit three-dimensional (3D) model data pertaining to one or more objects to render on the display as part of the video game. The first device may be a tablet computer while the second device may be a television.

In some implementations, the instructions may be executable to transmit, via a second sideband, the texture data and/or the 3D model data and to communicate, at the first device, with the second device to transmit frame-based data in a compressed data stream.

The details of present principles, both as to their structure and operation, can best be understood in reference to the accompanying drawings, in which like reference numerals refer to like parts, and in which:

DETAILED DESCRIPTION

The present application is directed to, among other things, a television (TV) or other display device that has a general purpose, high-end GPU along with fast RAM and local storage to render to itself at its best display rate. A separate computing device such as a cell phone may have a virtual GPU interface in it that may pass GPU rendering requests to the display device for rendering and displaying of game graphics, and to do so the computing device's existing PC GPU chip can do the work. A rendering protocol such as OpenGL or DirectX may be implemented across high speed frame based display interconnects such as DisplayPort or HDMI (as opposed to general purpose, packetized interconnects such as USB 3 or Firewire, for example) to get the graphics requests from the computing device to the display device. The computing device may have an intelligent algorithm that can transfer game asset files over the high-speed display link to the display device using a sideband.

Thus, during non-gameplay, the HDMI or DisplayPort connection may use its ordinary uncompressed frame based communication. Then when a game is initialized on the virtual GPU of the computing device, a first sideband may be opened across the HDMI or DisplayPort connection. The rendering requests for each game frame may be sent through the first sideband. To make room for this sideband, in some examples the frame based desktop of the computing device may be changed to a compressed stream, possibly with reduced quality. A second sideband may carry texture and model data to the display device that is to be used in rendering the game. The display device may then render the game frames and display them.

In some embodiments, a video game or special client software may send all the texture data to the display prior to gameplay for caching/buffering, so that it does not have to be sent redundantly over the display link during play. This might not be used in all embodiments though, as HDMI bandwidth may be 18 Gb/s versus 16 Gb/s for 2019 level Graphics DRAM. However, such an embodiment may be desirable for weaker clients that may not be able to provision a full HDMI link in real-time during play.

In any case, a display device consistent with present principles can respond to graphics rendering requests using a standard language over a display interface (as opposed to, for example, an RPC interface) to serve disparately powerful clients in a consistent manner. The present application also describes a display interface protocol that may share concurrent display of frame based data and graphics rendering requests, and also an example embodiment in which game textures may be cached ahead of time at the display device so that they can be locally rendered as needed instead of being received in real time during gameplay. Accordingly, a rendering engine may be implemented on the display device itself (rather than on the other device executing the video game) for rendering the video game's 3D mesh model, where the device executing the video game may indicate to the display device what 3D objects to load and then render at certain times, locations, and sizes within the video game according to movements indicated by the device executing the video game.

The video game itself may be, for example, a first person shooter game, a puzzle game, a role-playing game, an electronics sports game, etc.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may include a mobile communication device such as a mobile telephone, notebook computer, and/or other portable computerized device.

Figure 1:
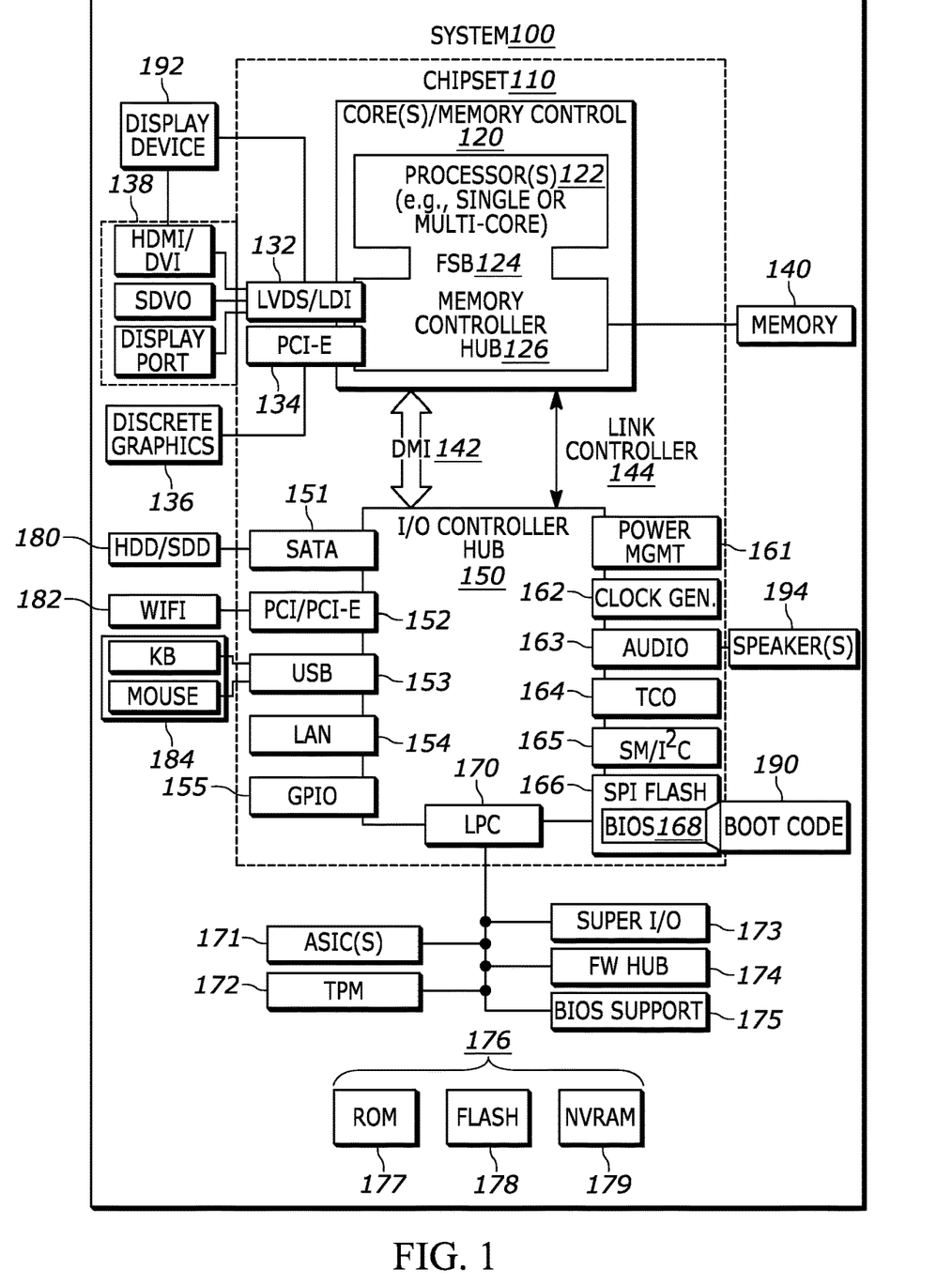
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone, and a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
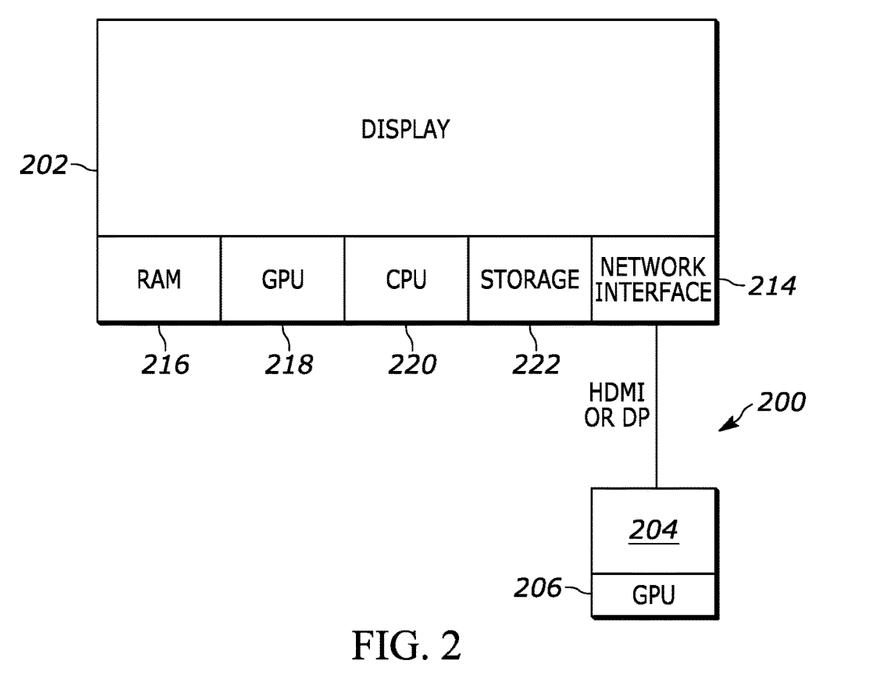
FIG. 2 is a block diagram of an example network of devices consistent with present principles.

FIG. 2 shows a smart phone or tablet computer 200 that may be in communication with a smart television (TV) 202. However, note that instead of the smart phone 200, another type of personal computer (PC) such as a laptop or notebook computer, convertible computer, and/or desktop computer may be used in some embodiments consistent with present principles.

The TV 202 itself may be a flat or curved screen TV such as a flat or curved liquid crystal display (LCD) TV, organic light-emitting diode (OLED) TV, plasma TV, quantum light-emitting diode (QLED) TV, etc. The TV 202 may be a high-definition TV (e.g., 780p or 1080p) or super high definition 4K TV (2,160p) or ultra-high definition 8K TV (4,320p). However, also note that in other examples another type of display device may be used instead of the TV 202, such as a stand-alone flat-panel computer monitor that is controlled by a separate desktop or laptop computer over a wired or wireless interface.

As also shown in FIG. 2, the smart phone 200 may include its own liquid crystal or LED touch-enabled display 204 as well as a graphics processing unit (GPU) 206 and other system components discussed above in relation to FIG. 1, such as a central processing unit (CPU), RAM, solid state drive (SSD) or hard disk drive (HDD) storage, a telephony and/or cellular telephone transceiver, other wired and/or wireless network interfaces (e.g., for communication over the Internet), etc. The touch-enabled display 204 may be used by an end-user for providing input to play a video game, though if a laptop computer were used instead then the laptop computer may also include a keyboard and/or touch-sensitive track pad that may be used for providing input for gameplay. However, also note that a wireless video game controller may also communicate with the smart phone 200 for an end-user to provide input to play a video game in some examples.

As also shown in FIG. 2, the smart phone 200 may communicate using its respective network interface with the TV 202 through the TV's own network interface 214. For example, the network interfaces may be high-definition multimedia interfaces (HDMI) to establish an HDMI connection between the smart phone 200 and TV 202. Additionally, the network interfaces may be DisplayPort (DP) interfaces to establish a DP connection between the smart phone 200 and TV 202. Note that while the connection between the smart phone 200 and TV 202 is shown in FIG. 2 as being a wired connection, it may also be established by a wireless HDMI or DP or other suitable connection.

FIG. 2 also shows that the TV 202 may include its own random-access memory (RAM) 216, graphics card and/or GPU 218, CPU 220, and solid state or hard disk storage 222. The GPU 218 may be, for example, a general-purpose high-end GPU with a 1,408 to 3,840 GPU core, a 1,200 to 1,650 MHz base clock, a 1,340 to 1,905 MHz boost clock, and 6 to 16 GB memory. The RAM 216 may also be for example high-end, such as synchronous dynamic random-access memory (DRAM) including Double Data Rate 4 (DDR4) RAM or even DDR3 RAM. The RAM 216 may be 8 gigabyte (GB), 16 GB, or 32 GB RAM with, for example, 2400 to 4400 MHz clock speeds.

The CPU 220 may also be, for example, high-end such as a 3.4 to 5 gigahertz (GHz) CPU. The storage 222 and/or storage may for example also be high-end, such as 1 terabyte (TB) internal hard disk or solid state storage.

Figure 3:
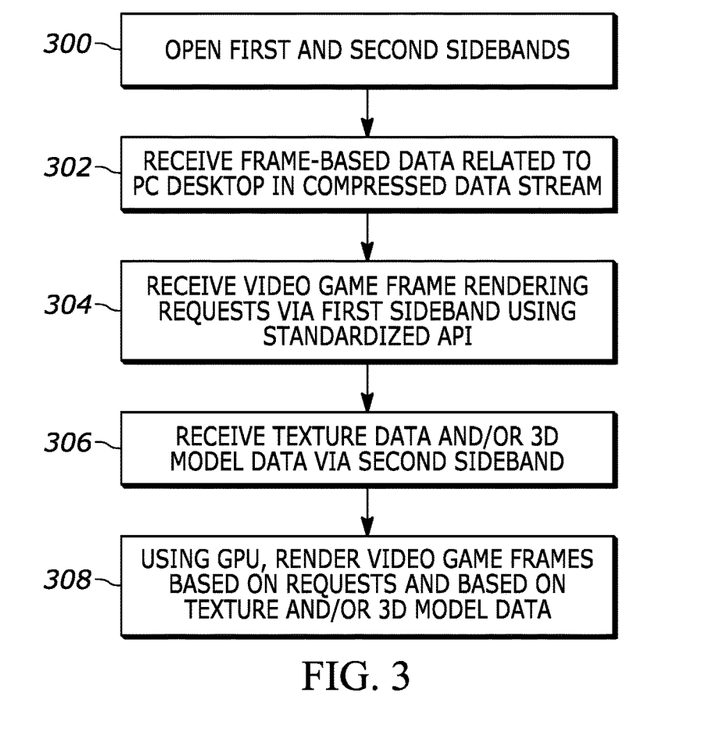
FIG. 3 is a flow chart of an example algorithm that may be executed by a display device such as a TV consistent with present principles.

Referring now to FIG. 3, it shows example logic that may be executed by a display device such as the TV 202 consistent with present principles. At block 300 the TV may open at least a first sideband of communication with a smart phone (or other PC type), and possibly a second sideband of communication with the smart phone while also facilitating communication with the smart phone over the baseband signal. Sideband modulation may be used for the sideband communication, and one of the sidebands may be an upper sideband while the other sideband may be a lower sideband relative to the baseband. The sidebands may be opened by the TV on its own accord responsive to connection to the smart phone via HDMI or DP, for example. Additionally or alternatively, the sidebands may be opened responsive to a command from the smart phone itself to open up the sidebands, which the smart phone might issue responsive to initializing/starting a video game at the smart phone.

From block 300 the logic may then proceed to block 302. At block 302 the TV may receive frame-based data from the smart phone. In certain examples, the frame-based data may be received in a compressed data stream over the baseband so that the smart phone can transmit the frame-based data in fewer bits relative to the original at the smart phone itself. Lossless or lossy data compression algorithms may be used. The frame-based data itself may be data related to the smart phone's operating system desktop contents, home screen, lock screen, desktop images, graphics, windows, and other visual content presented on the display of the smart phone itself but not necessarily related to a video game. Once received at the TV, the compressed data stream may be decompressed by the TV for presentation of the corresponding visual content on the TV's display as it might also be presented at the smart phone itself. For example, a real-time mirror image of the visual content presented on the smart phone's display may also be presented on the TV's display. From block 302 the logic may then proceed to block 304.

At block 304 the TV may receive, over the first sideband, video game frame rendering requests for the video game executing at the smart phone to in turn render images of the video game on the TV's display. Audio rendering requests for rendering corresponding audio for the video game using the TV's speakers may also be received over the first sideband. The video game frame requests may be communicated from the smart phone to the TV using a standardized application programming interface (API) such as OpenGL or DirectX. Using a standardized API may allow video gameplay using a smart phone/TV combination consistent with present principles even if different smart phone and TV combinations from different manufacturers or developers are used.

From block 304 the logic may then proceed to block 306. At block 306 the TV may receive, over the second sideband, graphical object data for graphical objects to be presented on the TV's display as part of the video game. The graphical object data may include, for example, texture data and three-dimensional (3D) model data whose use for video game rendering may be specified via the video game frame rendering requests themselves. The 3D model data may include rigging data and/or 3D mesh data, 3D video game object shape data, and/or a collection of points in 3D space to use in 3D rendering of graphical objects. In some examples, the 3D model data may also include game world lighting data and other game world data. Texture data may for example include, for each respective graphical object to be rendered, color data, lighting and reflectivity data, pattern data, etc. useable for texture mapping the 3D object for presentation. In some examples, the texture data may be established in a bitmap image and/or procedural texture.

After block 306 the logic may proceed to block 308. At block 308 the TV may, using its own local GPU, render video game frames and associated video game audio based on the requests received over the first sideband and based on the texture and 3D model data received over the second sideband.

Note that in some implementations the texture and/or 3D model data may be transmitted during gameplay over the second sideband concurrently with transmission of corresponding frame-based data over the first sideband. So, for example, texture and/or 3D model data may be received by the TV over the second sideband incrementally during gameplay as it might be needed for rendering different visual parts of the game at different stages of the game.

However, in other implementations the texture and/or 3D model data the TV will use to render 3D graphical objects and environments on its display during gameplay may be transmitted prior to gameplay beginning so that the data does not have to be sent redundantly over the display link during gameplay. Thus, for example, all texture and 3D model data the TV will use for graphics rendering during gameplay may be transmitted beforehand and stored in the TV's RAM (and/or even in local non-transitory storage such as the TV's SSD or HDD) so that the TV has the 3D object rendering data it will use beforehand for easy, quick access. The TV can then go lookup in its RAM the 3D object data it might need for rendering a 3D object at a given moment during gameplay upon receiving a corresponding video game frame rendering request that identifies the 3D object for presentation as part of gameplay.

Figure 4:
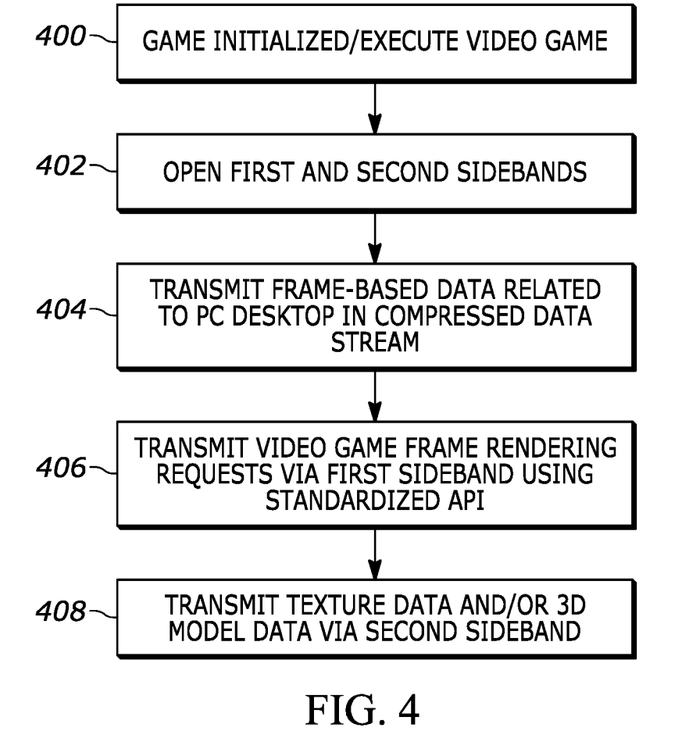
FIG. 4 is a flow chart of an example algorithm that may be executed by a computing device such as a smart phone or tablet computer consistent with present principles.

Continuing the detailed description in reference to FIG. 4, it shows example logic that may be executed by a smart phone or other PC to render video game frames on the display of a TV consistent with present principles. For example, a smart phone may execute the logic of FIG. 4 in conjunction with a TV executing the logic of FIG. 3 as described above.

As shown in FIG. 4, at block 400 the smart phone may initialize/execute a video game such as responsive to user command. The logic may then proceed to block 402 where the smart phone may open first and/or second sidebands with the TV. Then at block 404 the smart phone may transmit frame-based data related to the smart phone's desktop/home screen and/or computer controls (but possibly not related to the video game itself) to the TV in a compressed data stream, e.g., over the baseband being used for communication between the smart phone and TV.

From block 404 the logic may then proceed to block 406. At block 406 the smart phone may transmit video game frame rendering requests via the first sideband using a standardized API. The rendering requests may be generated based on execution of the video game itself at the smart phone and control of action within the video game commanded by the end-user playing the game at the smart phone. After block 406 the logic may proceed to block 408 where the smart phone may transmit, over the second sideband, graphical object data such as the texture data and 3D model data described above. But again note that while the graphical object data and texture data may be transmitted during gameplay, it may also be transmitted before gameplay begins.

Figure 5:
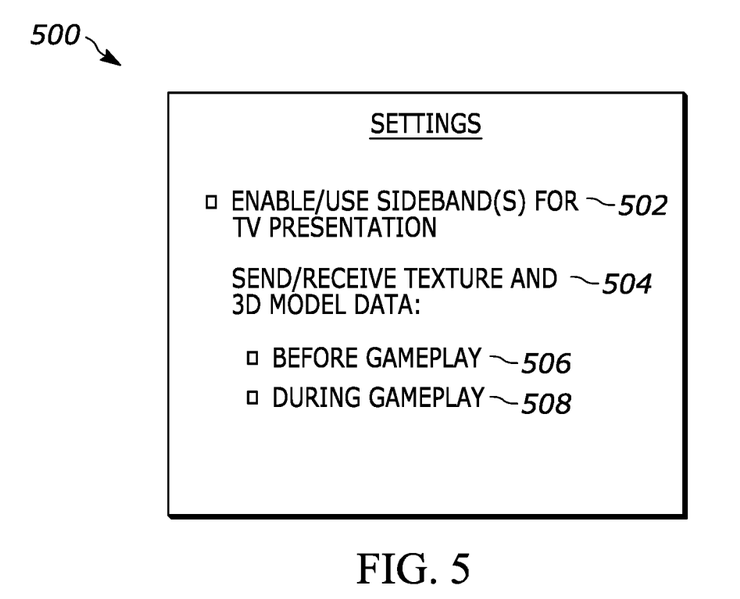
FIG. 5 is an example graphical user interface (GUI) that may be used for configuring settings of a device that operates consistent with present principles.

Now describing FIG. 5, it shows an example graphical user interface (GUI) 500 that may be presented on the display of a smart phone, TV, or other device to configure one or more settings for operation of a video gaming system consistent with present principles. So, for example, the GUI 500 may be presented to an end-user via his or her smart phone, or the GUI 500 may even be presented to a game developer as part of development of the video game itself prior to its release to the public.

As shown, the GUI 500 may include a first option 502 that may be selectable at the adjacent check box (e.g., using touch or cursor input) in order to enable the use of sidebands for video game presentation at a TV and also possibly presentation of corresponding audio using the TV's speakers or external surround sound speakers hooked up to the TV. Thus, in some examples selection of the option 502 may set or enable the video game software itself, the TV, and/or the smart phone to in the future undertake present principles as described herein. Deselection of the option 502 may in turn disable video game streaming from a smart phone to a TV as disclosed herein. As also shown in FIG. 5, the GUI 500 may include a setting 504 related to whether the smart phone should transfer graphical object data like texture data and 3D model data to the TV before gameplay begins (selectable option 506) or during gameplay (selectable option 508).

Before concluding, it is to also be understood that in some examples present principles may be used for video game frame rendering using a video projector that projects images onto a projection screen or wall of a personal residence using a lens system (rather than using, e.g., a TV for rendering).

It may now be appreciated that present principles provide for an improved computer-based user interface that improves the functionality and ease of use of the devices disclosed herein. TVs and other display devices as disclosed herein that may be more expensive, but may still have relatively longer use life, may have their higher-end components leveraged by a smart phone or other relatively lower-end device for gameplay on a larger screen. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor;
   a display accessible to the at least one processor;
   a graphics processing unit (GPU); and
   storage accessible to the at least one processor and comprising instructions executable by the at least one processor to:
   communicate with a second device to receive frame-based data in a compressed data stream, the second device being different from the first device;
   communicate with the second device to receive, via a first sideband, video game frame rendering requests;
   communicate with the second device to one or more of: receive texture data pertaining to one or more objects to render on the display as part of a video game associated with the video game frame rendering requests, receive three-dimensional (3D) model data pertaining to one or more objects to render on the display as part of the video game; and
   render on the display, using the GPU, video game frames based on the video game frame rendering requests and based on one or more of the texture data and the 3D model data;
   wherein the first device is established by a television, and wherein the second device is established by a smart phone.

2. The first device of claim 1, wherein the instructions are executable to:
   receive one or more of the texture data and 3D model data over a second sideband.

3. The first device of claim 2, wherein the second sideband is different from the first sideband.

4. The first device of claim 3, wherein the first and second sidebands are opened responsive to the video game being initialized.

5. The first device of claim 2, wherein one or more of the texture data and the 3D model data are received using a standardized application programming interface (API).

6. The first device of claim 1, wherein the communication with the second device occurs over one or more of: a high-definition multimedia interface (HDMI) connection, a DisplayPort (DP) connection.

7. The first device of claim 1, wherein the frame-based data received in the compressed data stream is related to an electronic desktop of the second device.

8. The first device of claim 1, wherein one or more of the texture data and 3D model data are received at the first device prior to the rendering the video game frames.

9. The first device of claim 1, wherein at least some of the texture data and/or 3D model data are received at the first device while the first device renders at least some of the video game frames.

10. The first device of claim 1, wherein the GPU is different from the at least one processor.

11. A method, comprising:
    communicating, at a first device, with a second device to receive video game frame rendering requests, the second device being different from the first device;
    communicating with the second device to one or more of: receive texture data pertaining to one or more objects to render on a display of the first device as part of a video game associated with the video game frame rendering requests, receive three-dimensional (3D) model data pertaining to one or more objects to render on the display as part of the video game; and
    rendering on the display, using a GPU on the first device, video game frames based on the video game frame rendering requests and based on one or more of the texture data and 3D model data;
    wherein the first device is established by a television, and wherein the second device is established by a smart phone.

12. The method of claim 11, comprising:
    communicating with the second device to receive frame-based data, wherein the frame-based data is received at the first device in a compressed data stream.

13. The method of claim 11, wherein the method comprises:
    communicating with the second device to receive, via a first sideband, the video game frame rendering requests.

14. The method of claim 13, wherein the method comprises:
    communicating with the second device via a second sideband different from the first sideband to one or more of: receive the texture data, receive the 3D model data.

15. At least one computer readable storage medium (CRSM) that is not a transitory signal, the computer readable storage medium comprising instructions executable by at least one processor to:
    execute a video game at a first device;
    communicate with a second device to transmit, via a first sideband, video game frame rendering requests, the video game frame rendering requests associated with the video game, the second device being different from the first device; and
    communicate with the second device to one or more of: transmit texture data pertaining to one or more objects to render on the display as part of the video game, transmit three-dimensional (3D) model data pertaining to one or more objects to render on the display as part of the video game;
    wherein the first device is a tablet computer and wherein the second device is a television.

16. The CRSM of claim 15, wherein the instructions are executable to:
   transmit, via a second sideband, the texture data and/or the 3D model data.

17. The CRSM of claim 16, wherein the instructions are executable to:
   communicate, at the first device, with the second device to transmit frame-based data in a compressed data stream.

18. The first device of claim 1, comprising random access memory (RAM) into which one or more of the texture data and the 3D model data are loaded for rendering on the display.

19. The CRSM of claim 15, comprising the at least one processor.

20. The CRSM of claim 15, comprising the video game.

* * * * *